United States Patent [19]
Harris

[11] Patent Number: 5,422,763
[45] Date of Patent: Jun. 6, 1995

[54] SPLIT FIELD ZONE DATA RECORDING

[75] Inventor: Stephen J. Harris, Sunnyvale, Calif.

[73] Assignees: Teac Corporation, Musashino, Japan; DZU Corporation, Sunnyvale, Calif.

[21] Appl. No.: 975,749

[22] Filed: Nov. 13, 1992

[51] Int. Cl.$^6$ .............................................. G11B 5/09
[52] U.S. Cl. ........................................ 360/51; 360/48
[58] Field of Search ................. 360/48, 49, 51, 77.04, 360/77.08, 77.06, 77, 77.02

[56] References Cited

U.S. PATENT DOCUMENTS

| | | | |
|---|---|---|---|
| 4,666,739 | 5/1987 | Roubal | 427/97 |
| 4,724,495 | 2/1988 | Hedberg et al. | 360/48 X |
| 4,790,912 | 12/1988 | Hotzman et al. | 204/15 |
| 4,810,333 | 3/1989 | Gulla et al. | 204/15 |
| 4,858,034 | 8/1989 | Hassel et al. | 360/51 |
| 4,920,434 | 4/1990 | Brown et al. | 360/77.08 |
| 5,073,834 | 12/1991 | Best et al. | 360/77.08 |
| 5,170,299 | 12/1992 | Moon | 360/77.08 |
| 5,210,660 | 5/1993 | Hetzler | 360/77.08 X |

OTHER PUBLICATIONS

Cirrus Logic Data Sheet dated Apr., 1992 entitled "High-Performance PC XT/AT Disk Controller", for the CL-SH360 product.

Primary Examiner—Donald Hajec
Assistant Examiner—Le Thien Minh
Attorney, Agent, or Firm—Willian Brinks Hofer Gilson & Lione

[57] ABSTRACT

A Split (Data) Field Zone Density Recording (ZDR) on a disk drive system is implemented using a disk controller with a servo timer. The servo timer estimates the periodic occurrences of the servo sectors, thereby eliminating the need for look-up tables and complex operating sequences. Whenever a servo sector is detected, a reset signal is sent to the servo timer which then estimates when the next servo sector can be expected. When the next servo sector is expected, the servo timer signals the disk controller. If this return signal from the servo timer occurs during a read/write of a split data sector, the read/write operation is suspended. The disk controller then waits for the next servo sector. After detecting the next servo sector, another reset signal is sent to the servo timer. The disk controller then synchronizes with the data bit stream and subsequently reads the remaining portion of the split data sector.

19 Claims, 16 Drawing Sheets

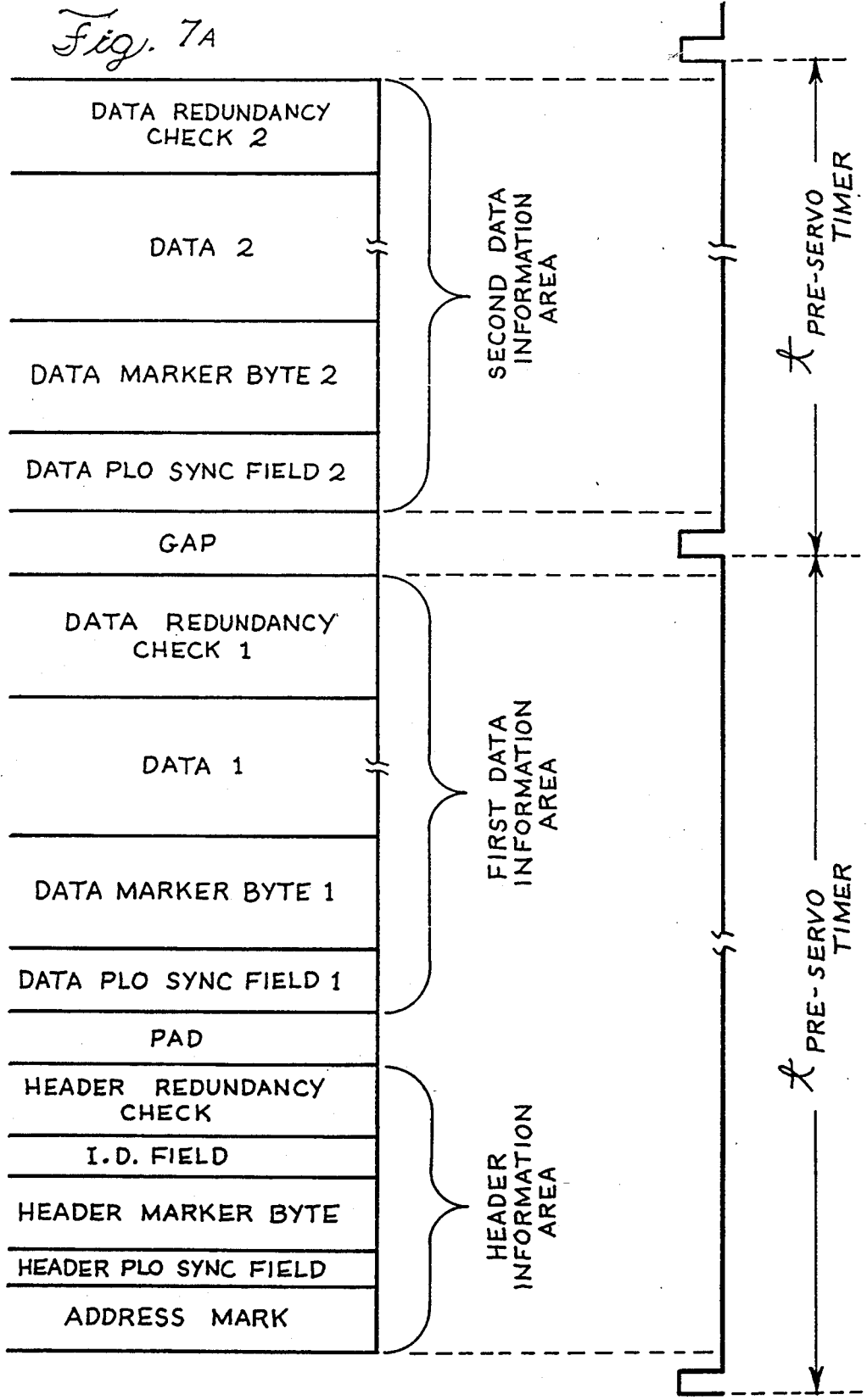

SECONDARY MAP INSTRUCTIONS

```
BIT(15 14 13  12 11 19  9  8   7  6  5  4   3  2  1  0)
      0  0  0   X  X  X  X  X   R  R  R  R   S  S  S  S    WAIT(STOP/RG OR SERVO)
     R = BR(RG), S = (BR(SERVO), NEXT INSTRUCTION = STOP CLOCK

BIT(15 14 13  12 11 10  9  8   7  6  5  4   3  2  1  0)
      0  0  1   C  C  C  C  C   X  X  X  X   X  X  X  X    WAIT(SERVO)
     C = COUNT(200ns), X = DON'T CARE

BIT(15 14 13  12 11 10  9  8   7  6  5  4   3  2  1  0)
      0  1  0   C  C  C  C  C   V  V  V  V   V  V  V  V    WAIT(SERVO, RG, RE-SYNC)
     C = COUNT(200ns), V = RE-SYNC COMPARE PATTERN

BIT(15 14 13  12 11 10  9  8   7  6  5  4   3  2  1  0)
      0  1  1   C  C  C  C  C   S  S  S  S   S  S  S  S    WRITE(SYNC)
     C = COUNT(BYTES), S = SYNC PATTERN

BIT(15 14 13  12 11 10  9  8   7  6  5  4   3  2  1  0)
      1  0  0   C  C  C  C  C   S  S  S  S   S  S  S  S    WRITE(RE-SYNC)
     C = COUNT(BYTES), S = RE-SYNC PATTERN

BIT(15 14 13  12 11 10  9  8   7  6  5  4   3  2  1  0)
      1  0  1   I  S  A  W  R   X  X  X  X   P  P  P  P    BRANCH
     I = ID, S = SYNC, A = AME, W = WG, R = RG, WR = BRANCH, P = POSITION

BIT(15 14 13  12 11 10   9  8   7  6  5  4   3  2  1  0)
      1  1  0   X  X  X   X  X   S  S  S  S   I  I  I  I    GOTO(PRIMARY)
     X = DON'T CARE, S = SEQUENCER ADDRESS, I = INTERNAL RAM ADDRESS

BIT(15 14 13  12 11 10   9  8   7  6  5  4   3  2  1  0)
      1  1  1   X  X  X   X  X   X  X  X  X   P  P  P  P    RETURN(JUMP)
     X = DON'T CARE, P = POSITION

BIT(15 14 13  12 11 10   9  8   7  6  5  4   3  2  1  0)
 0)    1  0  1   0  0  0   1  1   0  1  0  0   1  0  0  0    BRANCH(BR)
 1)    1  0  1   0  1  0   0  1   0  0  0  0   0  1  1  0    BRANCH(RG+SYNC)
 2)    1  0  1   0  0  1   0  1   0  0  0  0   1  1  0  0    BRANCH(WG+SYNC)
 3)    1  0  1   0  0  0   1  0   0  0  0  0   1  0  0  0    BRANCH(WG)
 4)    0  0  1   C  C  C   C  C   0  0  0  0   0  0  0  0    WAIT(SERVO)
 5)    1  1  1   0  0  0   0  0   0  0  0  0   0  0  0  0    RETURN(JUMP)
 6)    0  1  0   C  C  C   C  C   0  1  0  1   1  1  1  0    WAIT(SERVO, RG, RE-SYNC)
 7)    1  1  1   0  0  0   0  0   0  0  0  0   0  0  0  0    RETURN(RETURN)
 8)    0  0  0   0  0  0   0  0   0  1  0  0   0  1  0  0    WAIT(STOP/RG OR SERVO)
 9)    1  1  0   0  0  0   0  0   0  1  1  1   0  0  1  1    GOTO(PRIMARY)
10)    0  0  1   C  C  C   C  C   0  0  0  0   0  0  0  0    WAIT(SERVO)
11)    1  1  1   0  0  0   0  0   0  0  0  0   0  0  0  0    RETURN(JUMP)
12)    0  0  1   C  C  C   C  C   0  0  0  0   0  0  0  0    WAIT(SERVO)
13)    0  1  1   C  C  C   C  C   1  1  1  1   1  1  1  1    WRITE(SYNC)
14)    1  0  0   0  0  0   0  0   1  0  1  1   1  1  1  0    WRITE(RE-SYNC)
15)    1  1  1   0  0  0   0  0   0  0  0  0   0  0  0  0    RETURN(JUMP)
```

Fig. 9

SPLIT FIELD ZONE DATA RECORDING

FIELD OF THE INVENTION

This invention relates to disk drive storage systems. More particularly, this invention relates to split data fields, with servo fields embedded within the data fields on a Winchester disk drive.

BACKGROUND OF THE INVENTION

Winchester hard disk drives are well-known in the art. Typically, there are two or more recording magnetic surfaces. Data and servo (recording head positioning) information is recorded on the magnetic surface as digital pulses along concentric circles called tracks, starting from the inner radius and extending out to the outer radius. The tracks are bounded by two buffer zones located on the innermost radius and the outermost radius respectively.

Where there are multiple surfaces, one surface may be dedicated as a servo surface for controlling the flying magnetic heads. A dedicated servo surface allows correct head positioning as long as there are no mechanical or thermal effects which change the actual radius of a data track or create a tilt between the carriage of the heads and spindle of the disks. However, in low profile disk drive systems with fewer recording surfaces, the use of a dedicated servo surface further limits the data/servo efficiency. For example, in a single platter system with two recording surfaces, i.e. one data surface and one servo surface, the maximum theoretical data/servo efficiency is 50%. Similarly, in a dual platter system with four recording surfaces, i.e. one servo surface and three data surfaces, the maximum theoretical data/servo efficiency is 75%.

Alternatively, to avoid dedicating one recording surface entirely for servo fields, these servo fields can be dispersed between the data fields on all recording surfaces thereby freeing up an entire recording surface which increases the data/servo efficiency and improves tracking accuracy. This method of interleaving servo and data fields, commonly referred to as embedded servo, is now frequently used, especially for low profile hard disk drives having a minimal number of platters, necessary for fitting inside very compact portable personal computers.

In a conventional disk drive using a constant frequency recording method without a dedicated servo surface, all tracks from the outside radius to the inside radius hold the same amount of data, i.e. the same number of data sectors. Since the recording density of the outside radius is lower than that of the recording density of the inside radius, there is inefficient use of the outer tracks. With this technique, the data sectors are distributed evenly and separated by the servo fields, with servo fields radially aligned such that no discontinuity is encountered between tracks. FIG. 1 shows one example of a disk with constant frequency recording and interleaved servo and data. $T_1$, $T_2$ and $T_3$ are three tracks with different radii, but with an identical number and distribution of data sectors and servo fields. A first set of servo fields $S_{10}$, $S_{20}$ & $S_{30}$, a first set of data sectors $A_1$, $B_1$ & $C_1$, a second set of servo fields $S_{11}$, $S_{21}$ & $S_{31}$, a second set of data sectors $A_2$, $B_2$ & $C_2$, and a third set of servo fields $S_{12}$, $S_{22}$ & $S_{32}$ all line up radially.

One method for optimizing the use of the outer tracks is constant density recording which maintains the recording density of the innermost track throughout all the tracks on the disk surface. For example, if the inside radius of a 3.5 inch disk recording area is 0.9 inch and the outside radius is 1.71 inches, with constant density recording, the outermost track has 1.9 times the capacity of the innermost track, with a corresponding theoretical disk capacity increase of 45%. As a bonus, the data rate is also improved 1.9 times at the outermost track.

In most computer memory systems, data is packaged into data sectors, typically 512 bytes long each. Therefore, with constant density recording, the number of data sectors increases progressively in integer steps from the inside radius to the outside radius. As a result, there are multiple zones, each zone having the same number sectors on every track within the zone to approximate a constant density recording. This technique is referred to as Zone Data Recording (ZDR). FIG. 2 shows three tracks, $T_1$, $T_2$ and $T_3$, from three different zones, each representative of tracks having the same number of data sectors recorded at the same frequency within each respective zone.

In the above example, with 2000 tracks per inch (tpi) and 50 sectors at the innermost track. The number of tracks in a zone is tpi times the inside radius, divided by the number of sectors in the innermost track, or $2000 \times 0.9/50 = 36$. The number of zones on a disk is the radial span of the recording area $(1.71 \times 0.9)$ times the tpi, divided by the number of tracks in a zone, or $0.81 \times 2000/36 = 45$. Forty-five zones yields a theoretical efficiency of 44%, which compares fairly well with the previously calculated 45% capacity increase via constant density recording.

However, each zone requires different recording reference frequencies, filter parameters and data separation, which make it prohibitive from the data retrieval/storage management standpoint. Therefore, in practice, the number of zones is limited. Using the above example, with 5 zones instead of 45, the number of data sectors incremented between adjacent zones becomes $45/5 = 9$. The number of tracks in a zone being $36 \times 9 = 324$. This yields an actual capacity increase of 36%, which is still very attractive.

Unfortunately, using the first ZDR method described above in combination with embedded servo fields introduces a new problem. Since entire data sectors (typically 512 bytes long) have to be used, with frequencies changing between zones, the number of data sectors increasing towards the outside zones, and with servo field and data sector boundaries only matching within each zone, there is now a discontinuity of servo fields between zones. With this misalignment of servo fields at the zone boundaries, when a magnetic recording head crosses a zone boundary, there is no servo information available until the recording head is almost on a track. Hence track acquisitions in seek operations are not smooth and if the tracks on the zone boundary happen to be on a final approach of a seek, the settling or deceleration of the recording head will not be consistent.

FIG. 2 illustrates the above described seek problem. Tracks $T_1$, $T_2$ and $T_3$ of different zones, now have different recording frequencies, resulting in the misalignment of servo field boundaries across zone boundaries. A first set of servo fields $S_{10}$, $S_{20}$, & $S_{30}$ of different zones start out aligned along one servo sector extending radially outward from the center of the disk. However, after a first set of data sectors $A_1$, $B_1$ & $C_1$, a second set of servo fields $S_{11}'$, $S_{21}'$ & $S_{31}$ is radially misaligned relative to each other. The same is true of subsequent sets of servo fields such as $S_{12}'$, $S_{22}'$ & $S_{32}$.

A further enhancement of the above described ZDR method addresses the problem of misalignment of servo fields and is called the Split (Data) Field ZDR which is illustrated in FIG. 3. Here, all servo sectors are lined up radially with the same frequency, and the continuity and servo automatic gain control (AGC) can be preserved. However, the data sectors and the servo fields boundaries do not line up anymore and there is a price to pay. Now, an added data Phase Locked Loop (PLO) sync field and an additional data marker byte a pad is necessary because of data sector splitting, and this is typically in the order of 12–14 bytes in a 512 sector.

Within a zone, there may be variations of servo/data sector patterns, and the number of variations will multiply N-fold for N zones. The efficient handling of ZDR data requires setting up look-up tables for these variations. In the example above, with 5 zones and 512 byte data sectors, there are about 50 sectors per track multiplied by five zones, and multiplied by at least three bytes per table entry, yielding a table size of at least 750 bytes.

In addition to the above memory overhead, the disk controller is now burdened with a more complex sequence of events to read data sectors that have been split into two portions by servo sectors. A typical read sequence of a split data sector includes the following steps:
a) Read ID sync and sync byte.
b) Read ID and CRCC.
c) Read prescribed number of data bytes in first portion of the split data sector.
d) Store data in buffer and pause.
e) Wait until a servo field is read.
f) Read the second data sync field.
g) Read the remainder of prescribed data bytes of second portion of the split data sector.
h) Read ECC, store data, and report if the data is good.

In addition to the above described overheads of extra tables and complex operating sequences, prior art split field implementations have another disadvantage of being unable to split a data sector within its header information area. This is because typically the split data information is stored within the I.D. field of the header information area which must be retrieved before the controller knows where the split is located. As such, prior art split field implementation can only split the data sector at a location at least one data byte into the data field, in order for the data byte based counter to operate.

In the example of a Prior Art Split (Data) Field ZDR implementation illustrated in FIG. 3, tracks $T_1$, $T_2$ and $T_3$ are representative of three different frequency zones. Of particular interest is track $T_2$ where data sector $B_2$ is split into two portions $B_{2a}$ and $B_{2b}$. Note that the sets of servo fields $S_{10}$, $S_{20}$ & $S_{30}$, $S_{11}$, $S_{21}$ & $S_{31}$, and $S_{12}$, $S_{22}$ & $S_{32}$ of all three zones are now lined up radially just as in the constant frequency method illustrated in FIG. 1.

FIG. 10 shows a detailed layout of portions of a Prior Art split data sector comprising a header information area and a first data information area. The first data information area is followed by a similar second data information area (not shown).

In a conventional computer system, most of the disk drive hardware specific electronics is on a disk controller card. The host computer has no need and hence no knowledge of the actual physical location of the data and servo sectors on the disk drive(s). All the host computer and its operating system needs to know is the number of disk drive(s) available and the number of data sectors available on each drive(s).

In an IBM AT type computer system, the Disk Operating System (DOS) keeps track of where all the data reside within the available data sectors which are identified by their DOS data sector numbers. The host computer transfers data to and from the disk drive using I/O instructions via the Basic Input/Output System (BIOS) and the intelligent disk controller hardware, which are responsible for translating each DOS data sector number into a physical data sector location and retrieving the required data. The actual physical location and form of each individual data sector is transparent to the host computer using DOS. This gives disk drive manufacturers considerable latitude in designing the physical layout of the data and servo sectors, and implementing various schemes for increasing the data capacity of the disk drive including Split Field ZDR.

SUMMARY OF THE INVENTION

In accordance with this invention, prior art difficulties of Split (Data) Field Zone Density Recording (ZDR) implementations arising from memory overhead for look-up tables and complex operating sequences necessary to read the split data sectors, are overcome by using a disk controller having a servo timer comprising a pre-servo timer and a modulo timer. The servo timer provides a means of estimating the periodic occurrences of the servo sectors, thereby eliminating the need for look-up tables and complex operating sequences.

Whenever a servo sector is detected, a signal is provided to the pre-servo timer which then indicates, within a number of data bytes period accuracy (e.g. + or $-2\frac{1}{2}$ bytes), when the next servo sector can be expected. When the next servo sector is expected, the pre-servo timer signals a controlling state machine of the disk controller. If this return signal from the pre-servo timer occurs within a read/write of a split data sector, the first portion of the split data sector can be buffered. Meanwhile, the disk read/write operation is suspended.

The disk controller then waits for the next servo sector. When the next servo sector is detected, another signal is provided to the servo timer. The disk controller then synchronizes with the data bit stream and subsequently reads the second portion of the split data sector. Both portions of the split data sector can now be recombined to form a complete data sector.

DETAILED DESCRIPTION OF THE DRAWINGS

FIG. 7a shows a detailed layout of a split data sector in accordance with the invention.

FIG. 9 shows the instructions of the Secondary Map of the Secondary Sequencer.

Figure 11A:
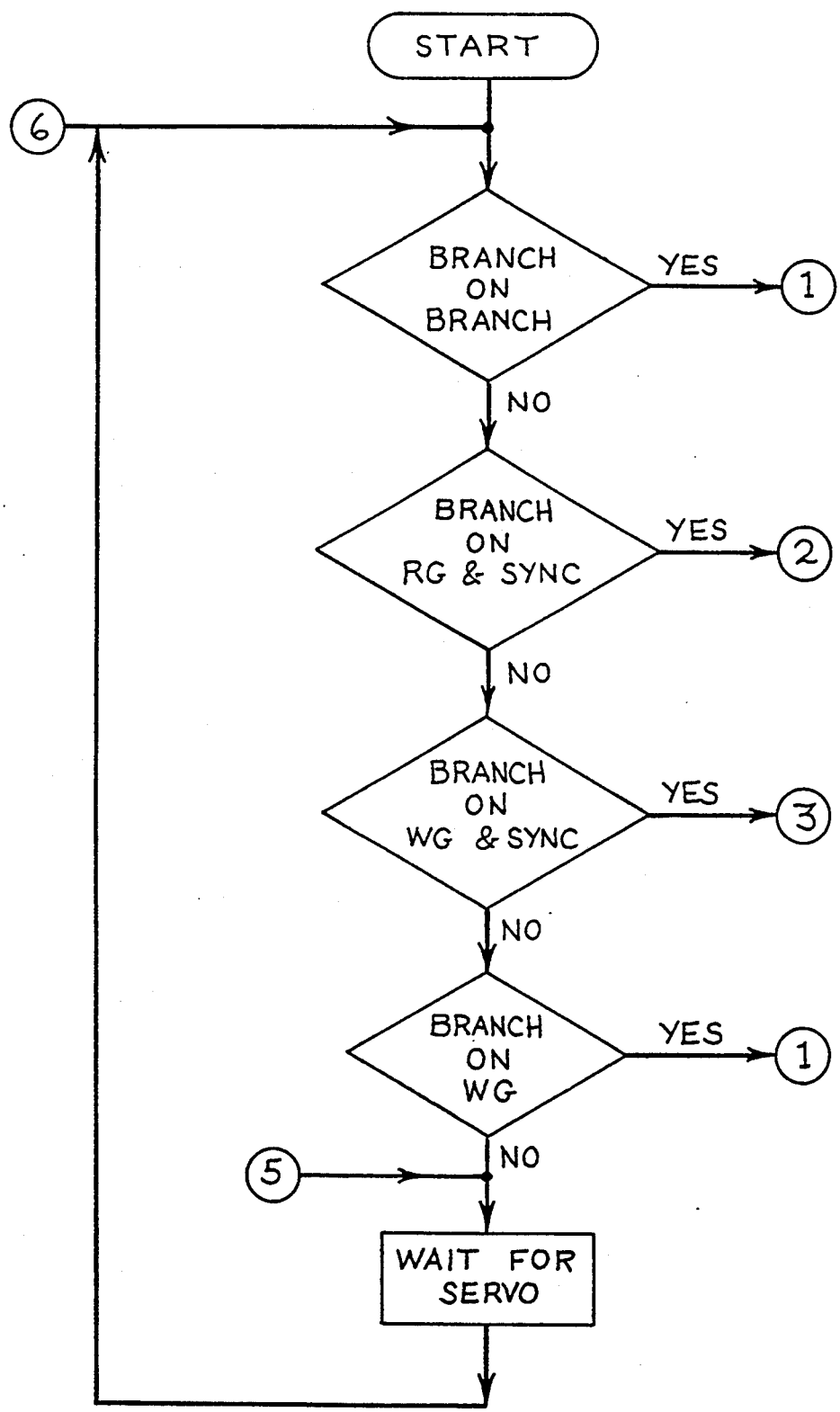
Figure 11B:
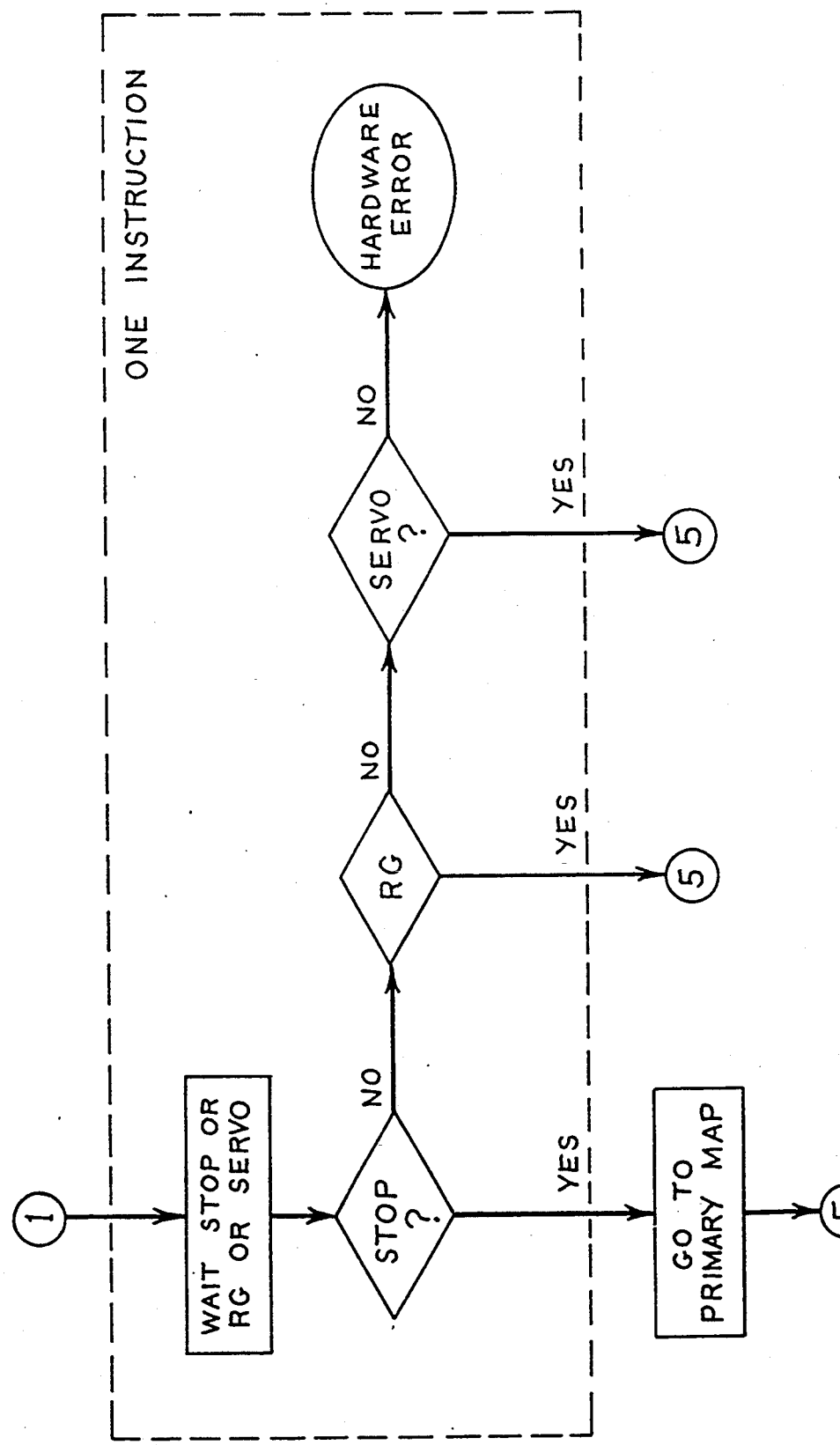
Figure 12:
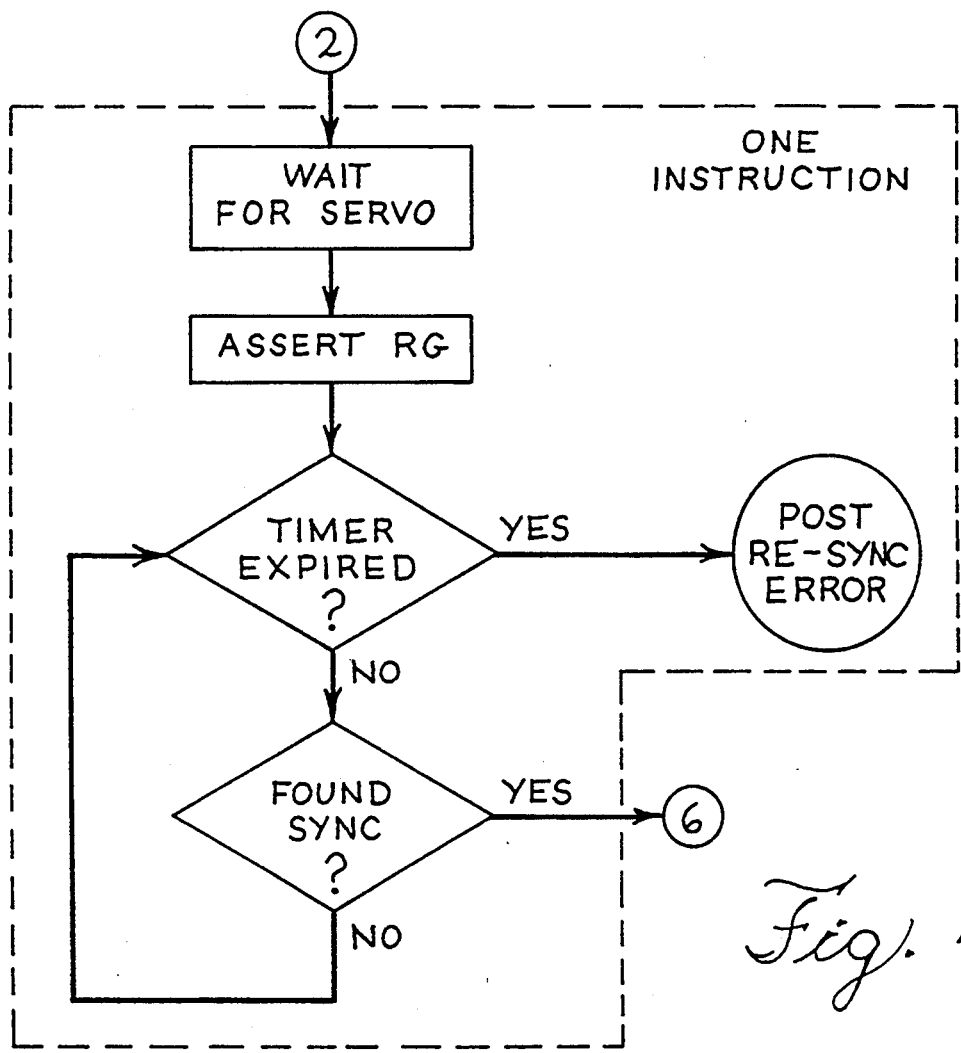
Figure 13:
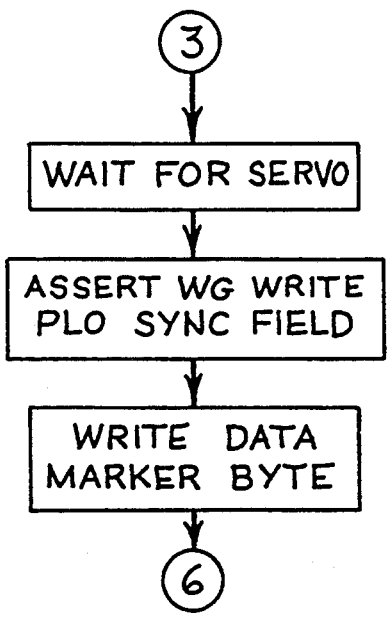

FIGS. 11a, 11b, 12 and through 13 are flow-charts illustrating the secondary sequence map of the Data Secondary Sequencer.

Figure 14:
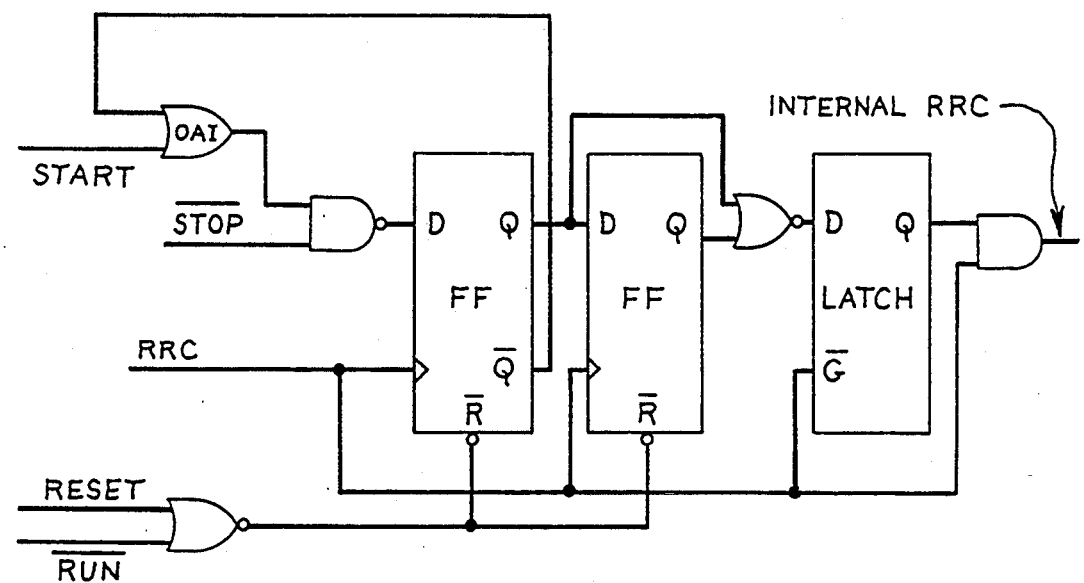
Figure 15:
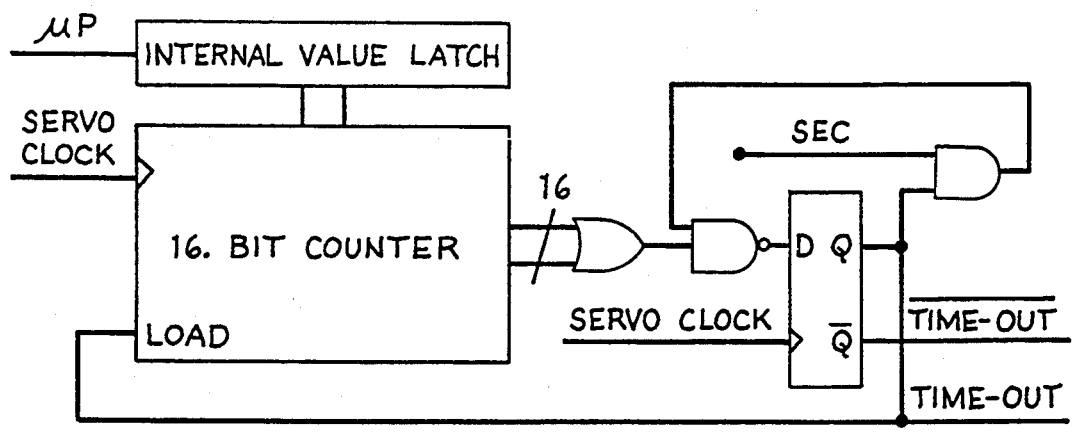
Figure 16:
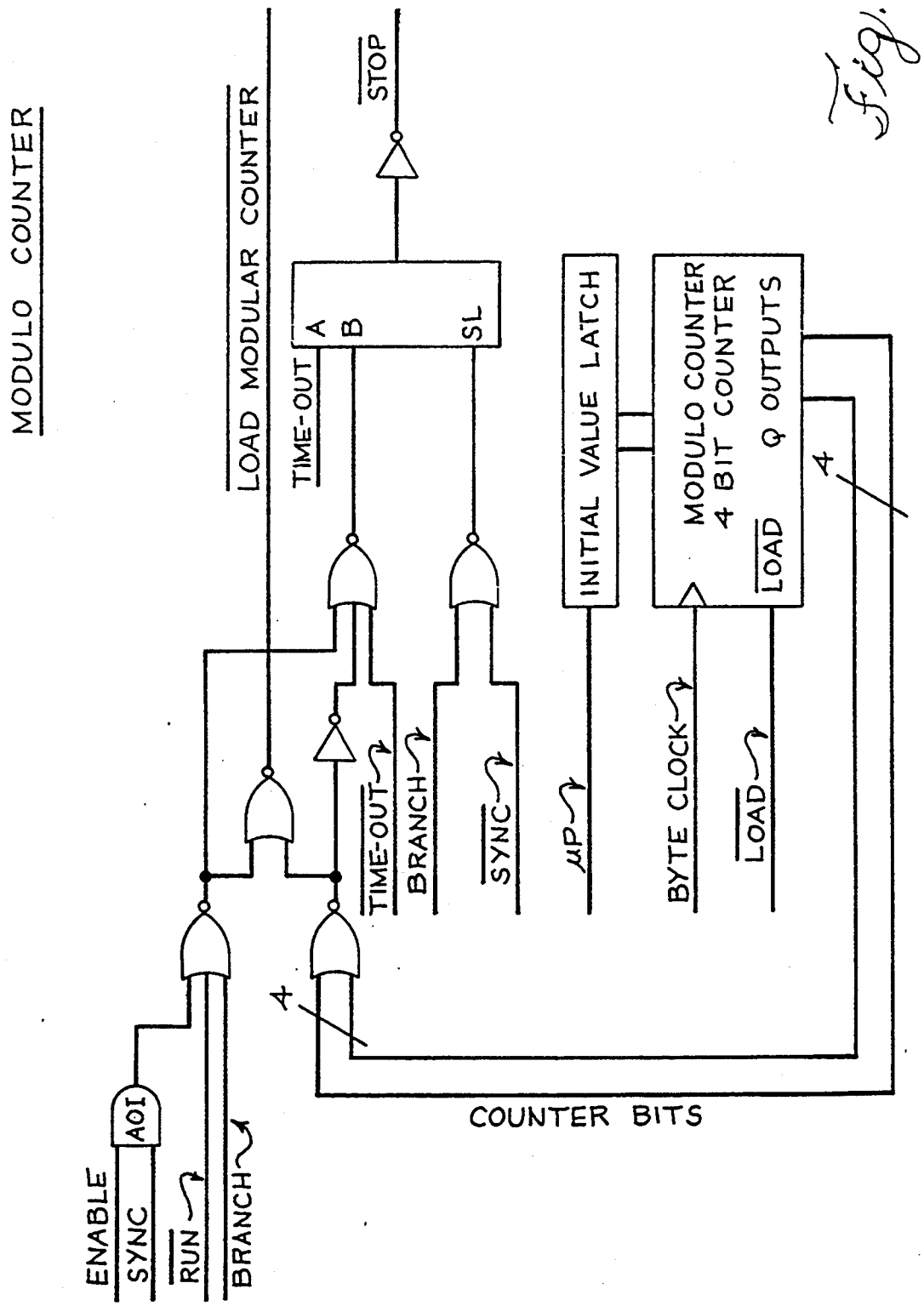

FIGS. 14 through 16 show the clock, pre-servo timer, and modulo counter of the Data Secondary Sequencer respectively.

DETAILED DESCRIPTION OF THE INVENTION

Figure 1:
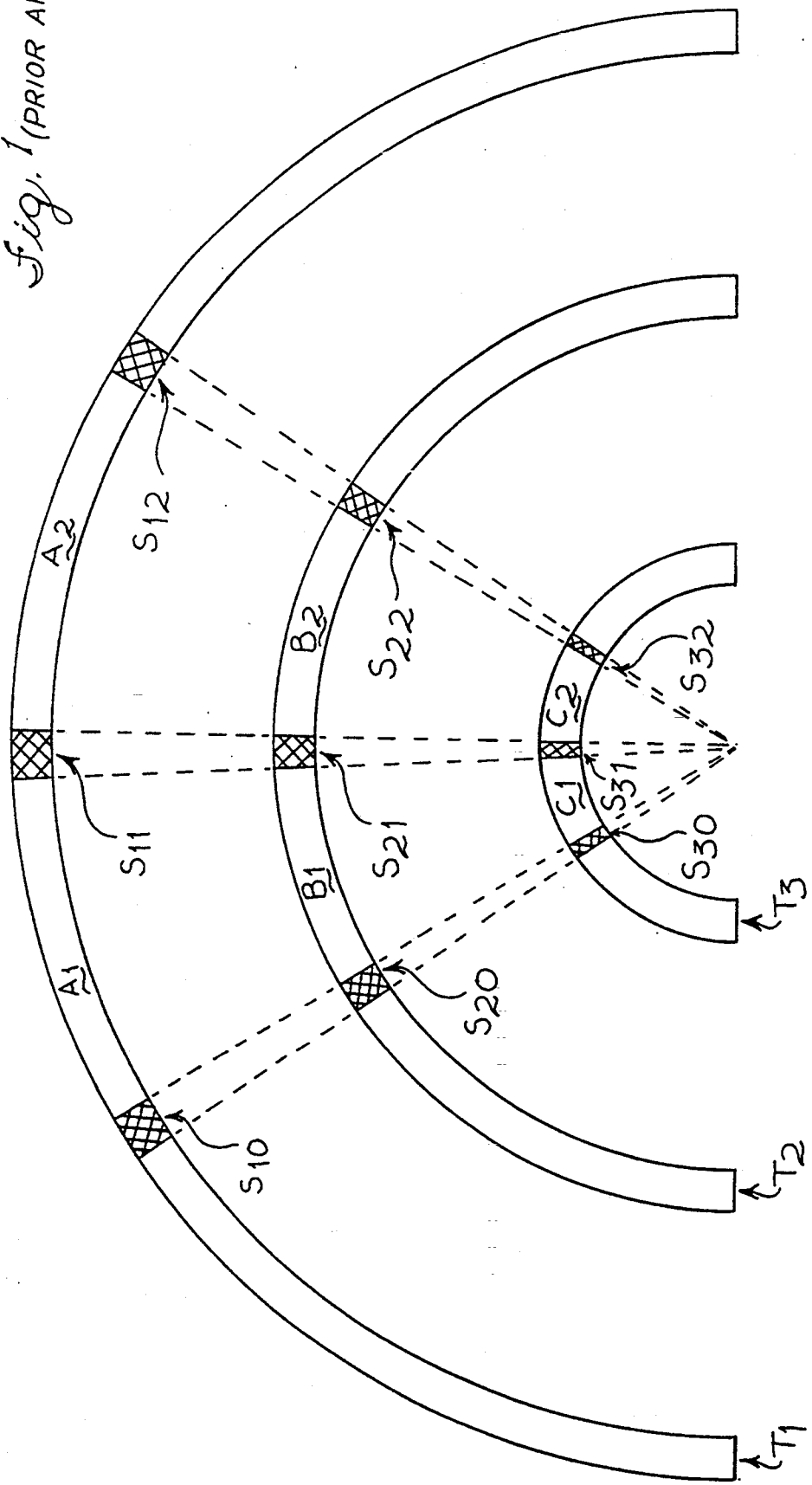
FIG. 1 shows three tracks $T_1$, $T_2$ and $T_3$ on one surface of a disk drive with constant frequency recording and interleaved servo and data fields.
Figure 2:
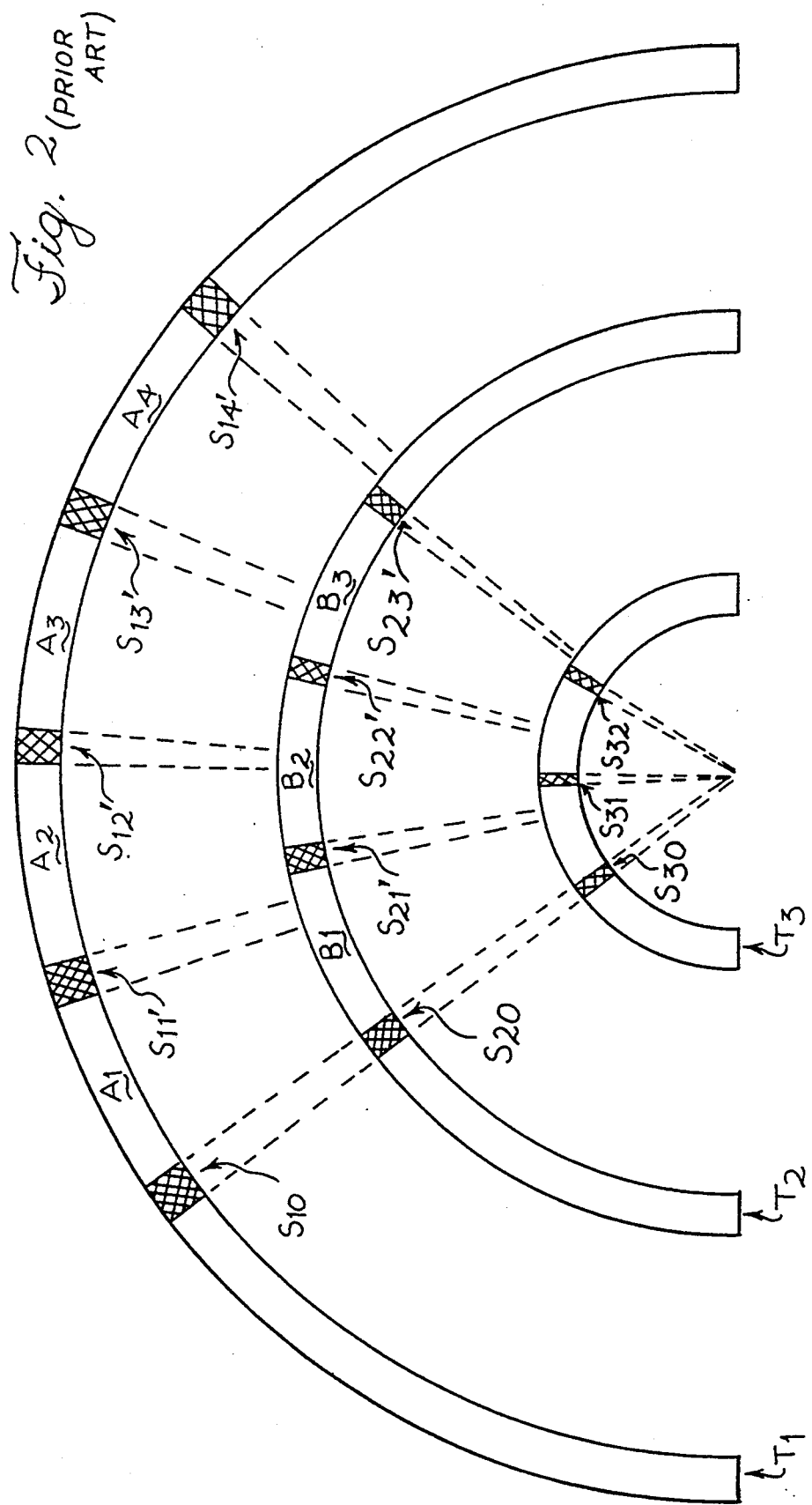
FIG. 2 shows three tracks $T_1$, $T_2$ and $T_3$ of different zones having different recording frequencies, resulting in the misalignment of servo field boundaries across zone boundaries.
Figure 3:
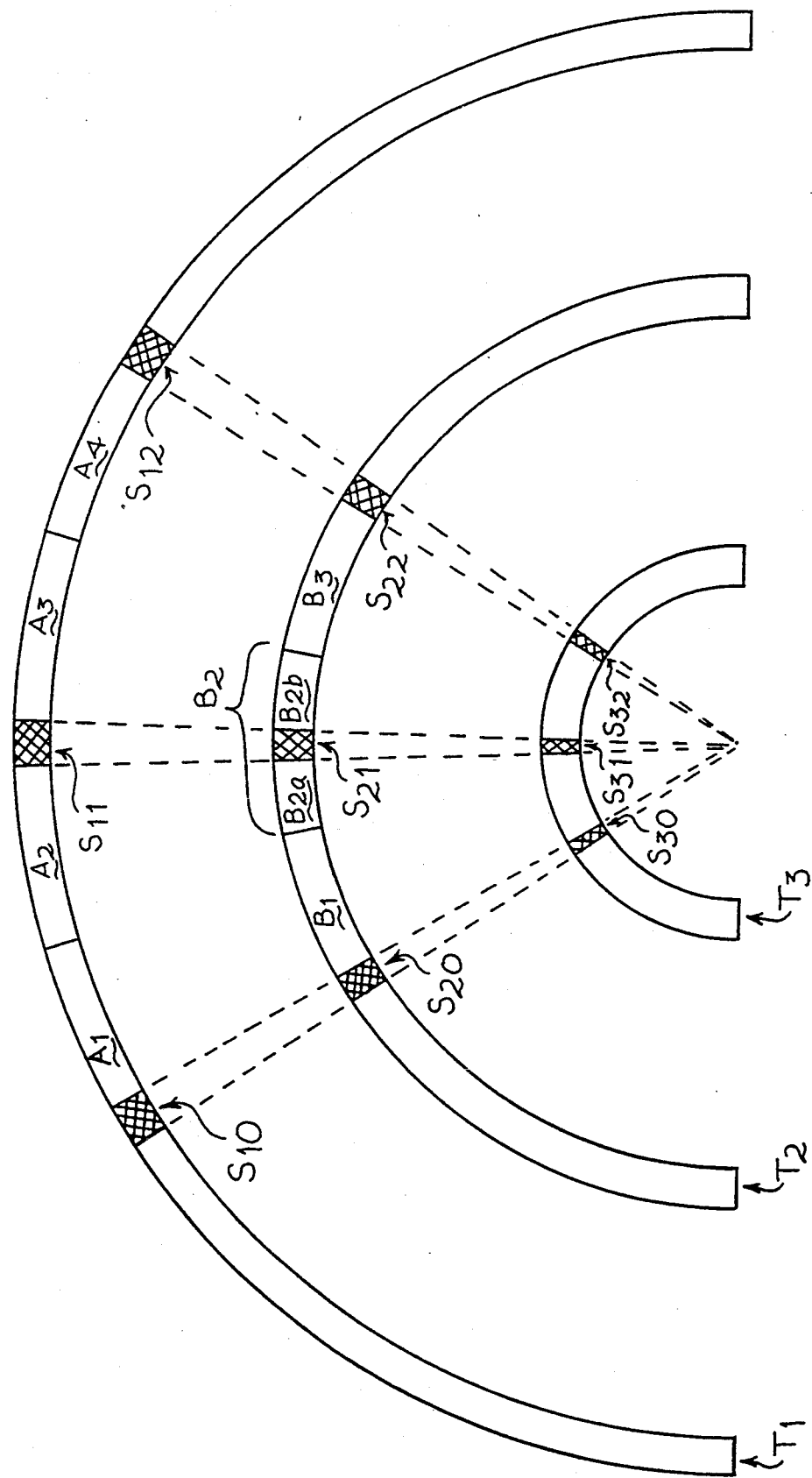
FIG. 3 shows an example of a prior art Split Field ZDR implementation with three tracks $T_1$, $T_2$ and $T_3$, each representative of three different frequency zones.
Figure 4:
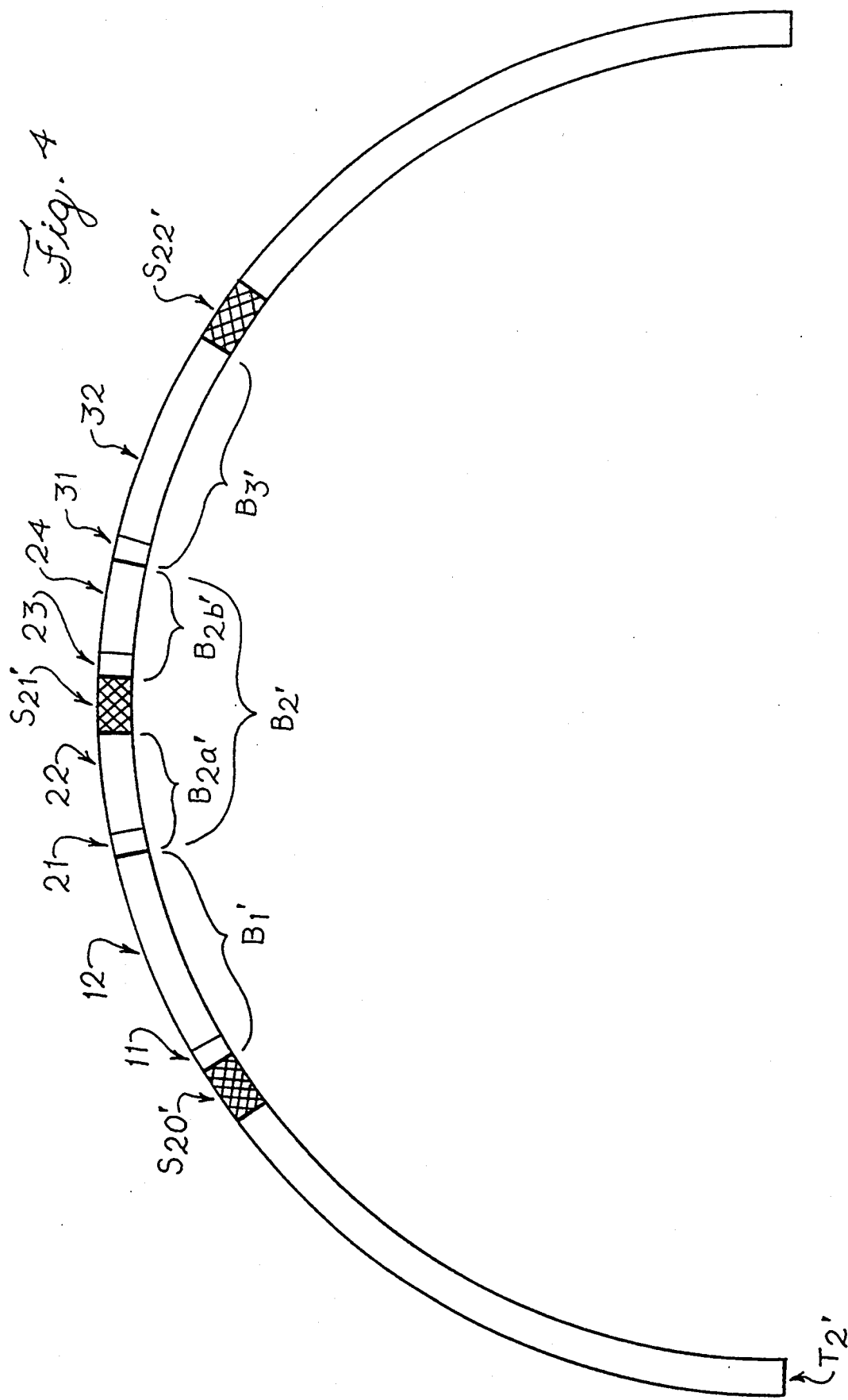
FIG. 4 shows the layout of track $T_2'$ as used in the present invention, with the fields of a data sector $B_2'$ split into two portions $B_{2a}'$ and $B_{2b}'$ by servo field $S_{21}'$

FIG. 4 illustrates in detail track $T_2'$ as used in the present invention, showing the fields of a data sector $B_2'$ which is split into two portions $B_{2a}'$ and $B_{2b}'$ by servo field $S_{21}$. The majority of the data sectors are not Split. For example, data sectors $B_1'$ and $B_3'$ each have data sync fields 11 & 31 and their respective contiguous remaining portions 12 & 32. In contrast, split data sector $B_2'$ has two separate data sync fields 21 & 23, each leading their separate remaining data portions respectively.

Figure 5:
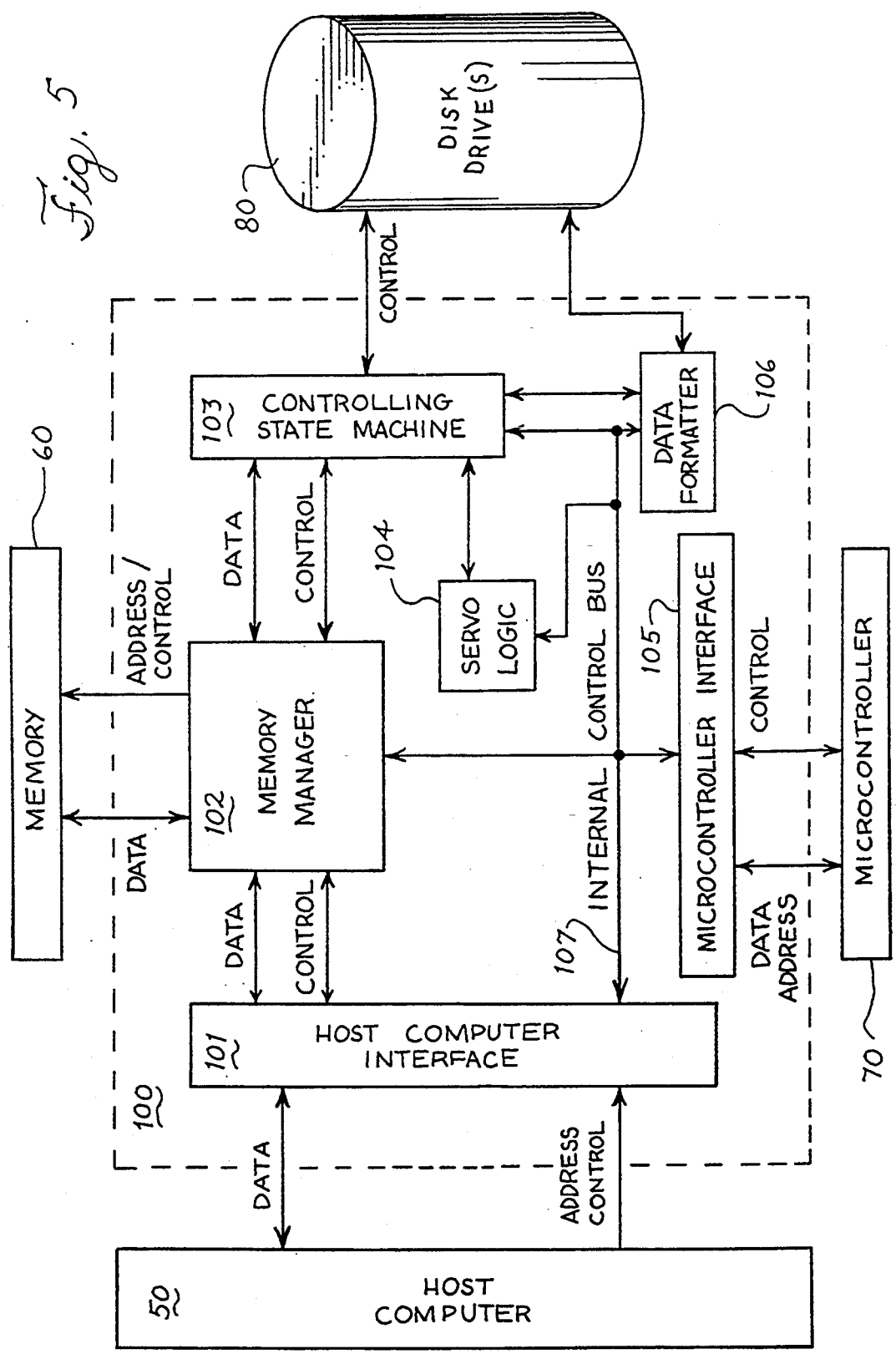
FIG. 5 shows a block diagram of a first embodiment of an intelligent disk controller having a highly efficient implementation of Split Field ZDR.

In accordance with the invention, FIG. 5 shows a block diagram of a first embodiment of an intelligent Disk Controller 100 having a highly efficient implementation of Split Field ZDR. The Disk Controller 100 comprises a Host Computer Interface 101, a Memory Manager 102, a Controlling State Machine 103, a Servo Logic 104 coupled to the State Machine 103, an Data Formatter 106 and a Microcontroller Interface 105.

The Host Computer Interface 100 is coupled to a Host Computer 50 and provides data formatting and control signal conversion. The Controlling State Machine 103 is coupled between the Memory Manager 102 and Disk Drive(s) 80, and provides control sequences to the disk drive(s) in response to commands from the Host Computer 50 for functions such as disk reads and writes. The Data Formatter 106 is coupled to the State Machine and provides data formatting, including data encoding/decoding and error correction.

The Microcontroller Interface 105 provides the interface between the Disk Controller 100 and a Microcontroller 70. The main function of the Microcontroller 70 is to provide the overall control of the other functional blocks on a disk controller card. Finally, The Servo Logic 104 provides the recording head assembly positioning control.

Figure 6:
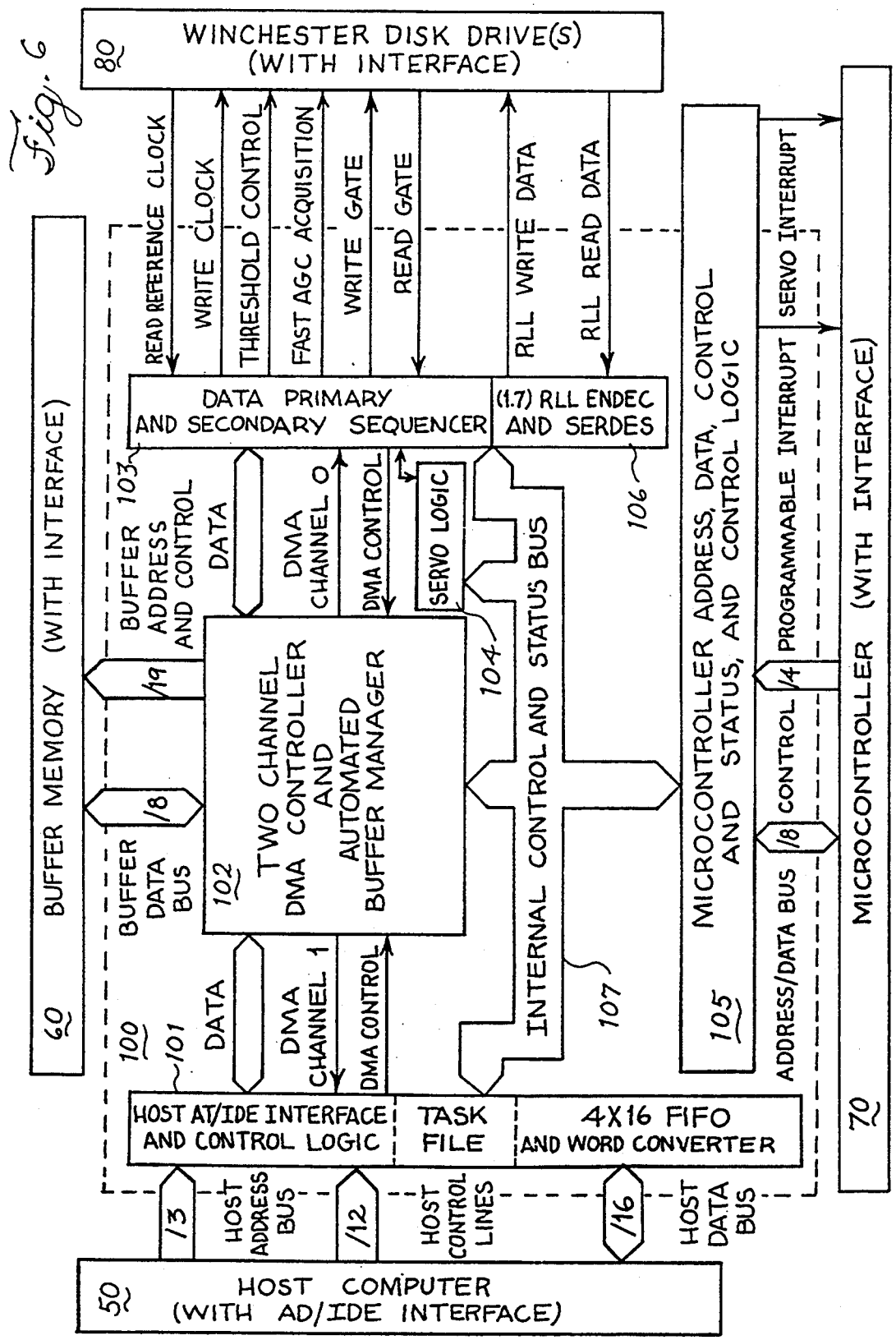
FIG. 6 shows a more detailed block diagram of the first embodiment of the intelligent disk controller for a IBM AT type Personal Computer having an AT/IDE peripheral interface.

FIG. 6 shows a block diagram of a more detailed implementation of the first embodiment of the intelligent Disk Controller 100 for a IBM AT type Personal Computer (PC) based on an Intel 80×86 type family of microprocessor and having an IBM PC AT/IDE peripheral interface. The Disk Controller 100 is a single chip controller designed to be used in conjunction with a Microcontroller 70 as one of the key components in a high-performance, low-cost, intelligent disk controller system. The Disk Controller 100 functions primarily as an interface for data to and from the Winchester Disk Drive(s) 80 to the Host Computer 50 having an IDE peripheral interface, while providing other functions such as data encoding/decoding and closed loop servo control of the disk drive magnetic head assembly positioner.

This particular embodiment has a multiple channel Direct Memory Access (DMA) Controller and Automated Buffer Manager 102. One DMA channel is used primarily for disk I/O operations such as disk reads or writes, and the other DMA channel is used by the Host Computer 50 for disk drive control operations. The Disk Controller 100 also has a Microcontroller Address, Data, Control and Status, and Control Logic 105 which is used by the Microcontroller 70 to access the various control and status registers internal to the Disk Controller 100, as well as to control the DMA channels on the DMA Controller 102. This architecture allows for simultaneous disk I/O data transfer and disk drive control operations, with the Microcontroller 70 maintaining control over the entire disk controller system.

In this embodiment, the Microcontroller 70 has an eight-bit multiplexed address and data bus similar to that of the Intel family of microcontrollers. The Address Logic portion of the Microcontroller Address, Data, Control and Status, and Control Logic 105 decodes I/O addresses of the internal set of registers starting at 00H through 3FH. This group of read and write registers allows the Microcontroller 70 to configure the Disk Controller 100 to properly interface with the architecture of the Host Computer 50, the Winchester Disk Drive(s) 80 and the Buffer Memory 60.

Microcontroller 70 uses addresses 00H through 0FH to set all the necessary parameters for operating in an IBM PC AT/IDE environment. The Microcontroller 70 sets most of the registers only once at power-on initialization time (e.g. setting the translation parameters or the INTRQ delay). Other registers may be written more often to enable or disable certain features (e.g. halting the Buffer Manager 102 for a Host Verify command). If certain automatic features of the Disk Controller 100 are disabled, these registers also provide the Microcontroller 70 with access to a Host Task File portion of the Host AT/IDE Interface and Control Logic 101 for purposes such as initialization or error reporting of the disk writes. This group of registers can also be read by the Microcontroller 70 to obtain the current Host Computer 50 disk drive command.

Registers 10H through 1FH allow the Microcontroller 70 to monitor, set up and modify the operation of both channels of the DMA Controller 102. Data may also be transferred via these registers between the Buffer Memory 60 and the Microcontroller 70. Other uses for these registers include implementations of a variety of read-look-ahead cache schemes.

Other registers 20H through 2FH enable the Microcontroller 70 to control and monitor the operations of the Data Primary and Secondary Sequencer 103. Through these registers, the Microcontroller 70 can set up "sequencer maps" which are small firmware programs to perform specific disk functions such as Format, Read, Read Sector ID, and Write. This block of registers also provide the transparency of the actual physical addresses of the data sectors on the Winchester Disk Drive(s)

Registers 30 through 3FH provide some special functions which are helpful in the design of an embedded servo control system. They provide the Microcontroller 70 with the capability to configure the servo control fields parameters.

The Buffer Manager 102 is designed to reduce the amount of firmware control required in the implementation of a disk drive control system and to improve overall system performance. One of the Buffer Manager's 102 primary functions is to control the Buffer Memory 60 such that once a data transfer has begun, the incoming data pointer maintained by the Buffer Manager 102 never overtakes its outgoing data pointer. This is accomplished by keeping track of when an incoming data buffer is valid and when an outgoing transfer has completed. Additional features are built into the Buffer Manager 102 for halting automatically upon an error condition.

The Buffer Manager 102 has features which simplifies the use of different size Buffer Memory 60 with user programmable "partitions" for both disk reads and writes. This feature of the Buffer Manager 102 simplifies implementations of complex cache schemes with multiple buffer partitions. The Buffer Manager 102 can also reduce command signal overhead by detecting Write commands and automatically accepting data into the Buffer Memory 60, thereby freeing the Microcontroller 70 to perform other tasks required by the Write command such as moving the magnetic recording head assembly.

The Encoder/Decoder and Serializer/Deserializer (EN/DEC & SER/DES) 106 is coupled to the Data Primary and Secondary Sequencer 103, the Internal Control and Status Bus 107 and the Winchester Disk Drive(s) 80. The Encoder/Decoder portion of the EN/DEC & SER/DES 103 also provides automatic CRC generation, Error Code Correction (ECC) generation, error detection, encoding and decoding of the data to and from the Winchester Disk Drive(s) The Data Primary and Secondary Sequencer 103 can be programmed to stop on an error condition or a number of other conditions to allow the Microcontroller 70 to correct errors, recover reassigned blocks, perform retries and process other error conditions. The Serializer/Deserializer portion of the EN/DEC & SER/DES 106 converts the data from the conventional 8-bit byte format to Not Return Zero (NRZ) format prior to transfer from the Buffer Memory 60 to the Winchester Disk Drive(s) 80 and vice versa.

Referring again to FIG. 6, the Data Primary and Secondary Sequencer 103 comprise two groups of Random Access Memory (RAM) registers programmable by the Microcontroller 70. A primary group of registers has the responsibility for handling data read/write operations to and from the Disk Drive(s) 80. These read/write operations include Format Track, Disk Reads or Writes, Read Sector IDs and Read Error Correcting Code (ECC). The Data Primary and Secondary Sequencer 103 also has a secondary group of registers which allows the implementation of a fixed frequency servo field as used in the present invention, by allowing split data fields, ID fields, and Sync fields.

The primary function of the Secondary Sequencer 103 is to detect and skip over the servo field and signal the Primary Sequencer 103 to resume the reading/writing of the second portion of a split data sector. Of particular interest is the secondary sequencer map portion of the Data Primary and Secondary Sequencer 103 that provides the Split (Data) Field ZDR capability. FIG. 7a shows the layout of a split data sector in accordance to the invention. Note that since there is no need to store any split data field information in the header information area of a split data sector, with this scheme, it is possible to split a data sector within the header information area of the data sector. This provides advantages over the prior art implementations, including reducing the size of the ID field of the header information area of a data sector and by increasing the amount of useful track space of the different zones.

Figure 8:
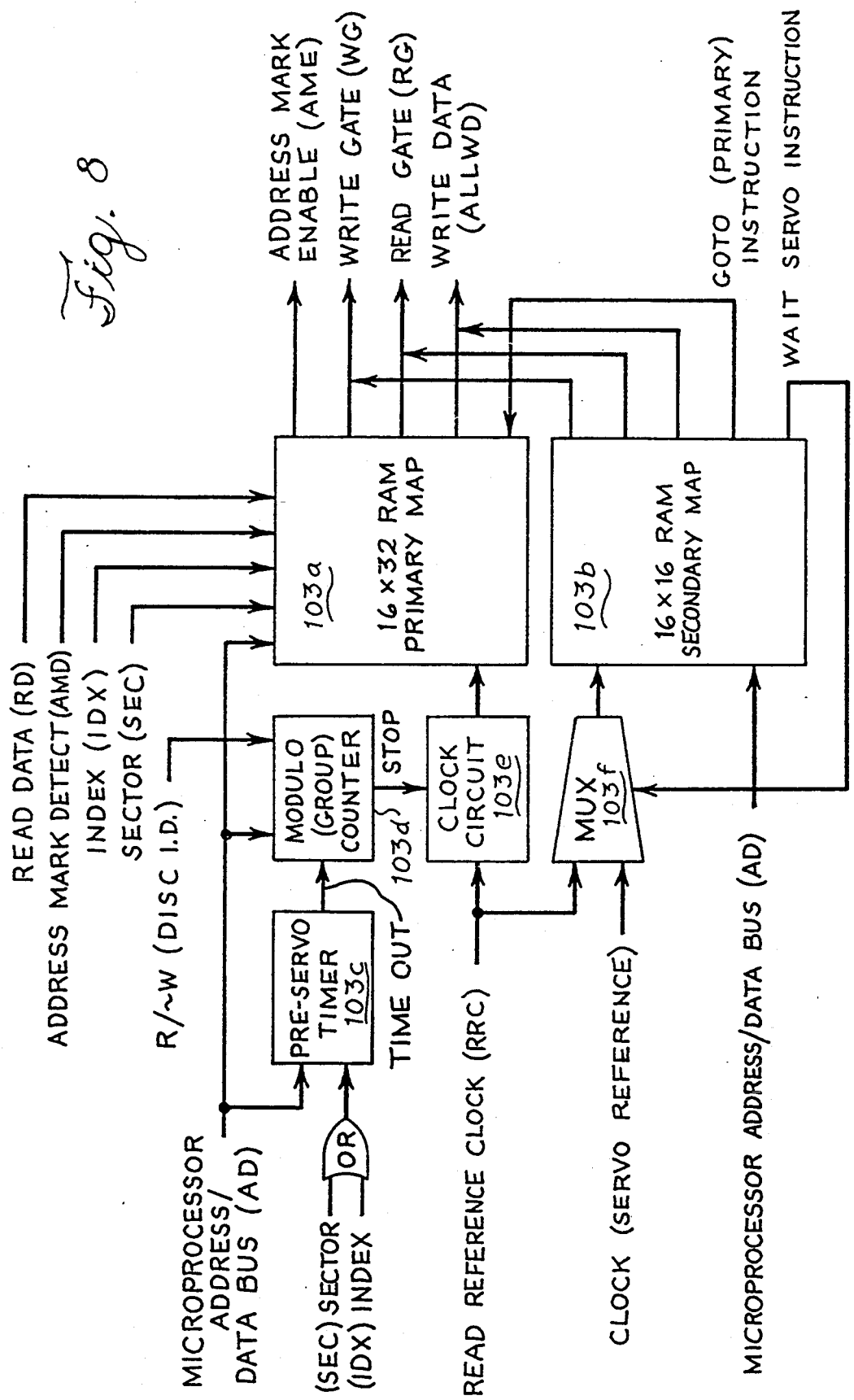
FIG. 8 shows a detailed block diagram of the Data Primary and Secondary Sequencer.
Figure 10:
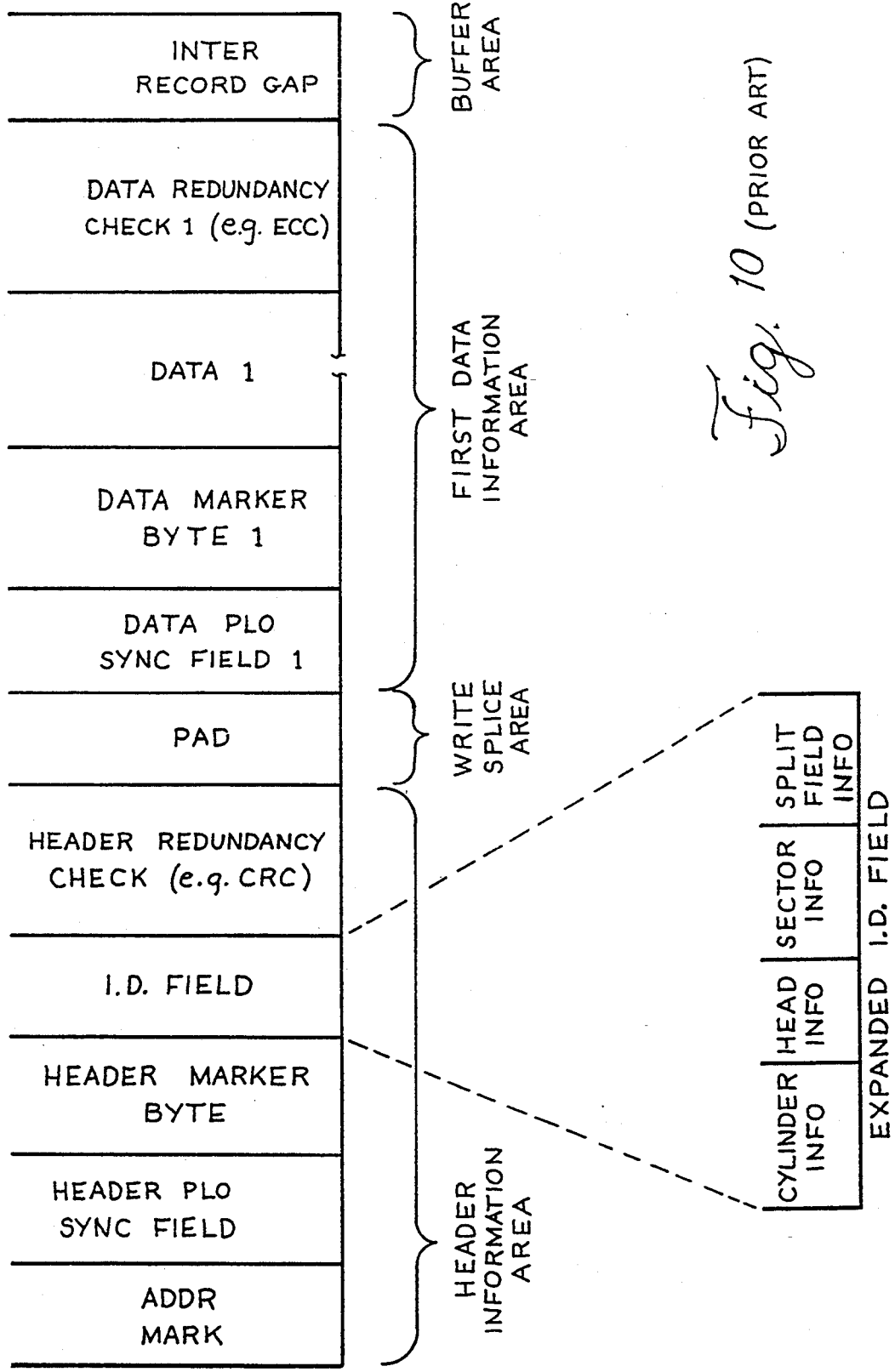
FIG. 10 shows a detailed layout of the header information area and the first data information area of a Prior Art split data sector.

FIG. 8 shows a more detailed block diagram of the Data Primary and Secondary Sequencer 103. The Primary Sequencer Map 103a is a 16×32 bit RAM which is responsible for disk control functions such as Read Gate (Read Enable) and Write Gate (Write Enable).

Figure 7B:
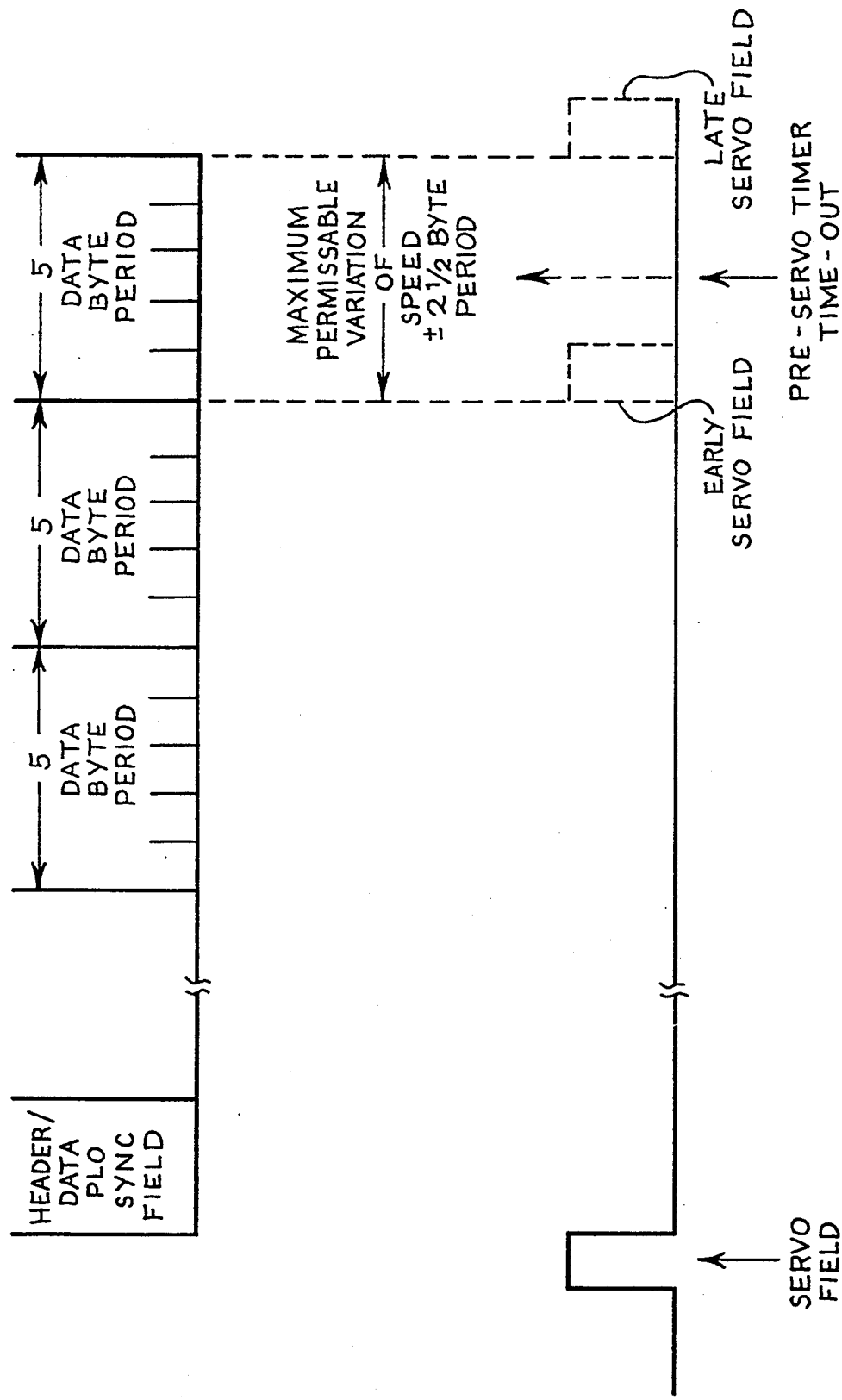
FIG. 7b shows a layout of the last three groups of bytes of the first portion of a split data sector prior to the warning signal from the pre-servo timer.

Referring now to FIG. 7b, which shows an example of the last three groups, each five data byte period long, of a first data information area of a split data sector. This number, i.e. the number of bytes in each group is configurable and for the purpose of illustration is set at five bytes. The group number is necessary to accommodate the variations in rotational speed of the disk drive.

FIGS. 14 through 16 show the clock, pre-servo timer, and modulo counter of the Data Secondary Sequencer 103. In this embodiment, there are two asynchronous timers, the Pre-servo Timer 103c and the Modulo Counter 103d. The Modulo Counter 103d continuously synchronizes itself to the data bit stream from the read/write head, counting and resets itself between each group of bytes. The Pre-servo Timer 103c indicates when the next servo field is expected and sends a TIMEOUT signal to the Modulo Counter 103d. Each time the Modulo Counter 103d resets itself, it also check to see if it has received a TIMEOUT signal from the Pre-servo Timer 103c within the last group of bytes. If a TIMEOUT signal was received, the Modulo Counter 103d send a STOP signal to the Clock Circuit 103e which in turn send a SUSPEND signal to the Primary Sequence Map 103a, suspending the read or write operation. After the Secondary Sequence Map 103b detects a servo field, it signals the Primary Sequence Map 103a to resume reading or writing the next portion of the split data sector.

The instructions in the 16×16 RAM of Secondary Map 103b in the Secondary Sequencer 103 are shown in FIG. 9 and are described in greater detail in the tables below:

| SECONDARY MAP (READ/WRITE) INSTRUCTIONS | | | | | | | | | | | | | | | | |
| --- | --- | --- | --- | --- | --- | --- | --- | --- | --- | --- | --- | --- | --- | --- | --- | --- |
| BIT | (15 | 14 | 13 | 12 | 11 | 10 | 9 | 8 | 7 | 6 | 5 | 4 | 3 | 2 | 1 | 0) |
| | 0 | 0 | 0 | x | x | x | x | x | R | R | R | R | S | S | S | S | WAIT (STOP/RG OR SERVO) |
| R = BR(RG), S = BR(SERVO), NEXT INSTRUCTION = STOP CLOCK | | | | | | | | | | | | | | | | |
| BIT | (15 | 14 | 13 | 12 | 11 | 10 | 9 | 8 | 7 | 6 | 5 | 4 | 3 | 2 | 1 | 0) |
| | 0 | 0 | 1 | C | C | C | C | C | X | X | X | X | X | X | X | X | WAIT(SERVO) |
| C = COUNT(200nS), X = DON'T CARE | | | | | | | | | | | | | | | | |

| | | | | | | | | | SECONDARY MAP (READ/WRITE) INSTRUCTIONS | | | | | | | |
|---|---|---|---|---|---|---|---|---|---|---|---|---|---|---|---|---|---|
| BIT | (15 | 14 | 13 | 12 | 11 | 10 | 9 | 8 | 7 | 6 | 5 | 4 | 3 | 2 | 1 | 0) | |
| | 0 | 1 | 0 | C | C | C | C | C | V | V | V | V | V | V | V | V | WAIT(SERVO, RG, RE-SYNC) |
| | C = COUNT(200nS), V = RE-SYNC COMPARE PATTERN | | | | | | | | | | | | | | | | |
| BIT | (15 | 14 | 13 | 12 | 11 | 10 | 9 | 8 | 7 | 6 | 5 | 4 | 3 | 2 | 1 | 0) | |
| | 0 | 1 | 1 | C | C | C | C | C | S | S | S | S | S | S | S | S | WRITE(SYNC) |
| | C = COUNT(BYTES), S = SYNC PATTERN | | | | | | | | | | | | | | | | |
| BIT | (15 | 14 | 13 | 12 | 11 | 10 | 9 | 8 | 7 | 6 | 5 | 4 | 3 | 2 | 1 | 0) | |
| | 1 | 0 | 0 | C | C | C | C | C | S | S | S | S | S | S | S | S | WRITE(RE-SYNC) |
| | C = COUNT(BYTES), S = RE-SYNC PATTERN | | | | | | | | | | | | | | | | |
| BIT | (15 | 14 | 13 | 12 | 11 | 10 | 9 | 8 | 7 | 6 | 5 | 4 | 3 | 2 | 1 | 0) | |
| | 1 | 0 | 1 | I | S | A | W | R | X | X | X | X | P | P | P | P | BRANCH |
| | I = ID, S = SYNC, A = AME, W = WG, R = RG, WR = BRANCH, P = POSITION | | | | | | | | | | | | | | | | |
| BIT | (15 | 14 | 13 | 12 | 11 | 10 | 9 | 8 | 7 | 6 | 5 | 4 | 3 | 2 | 1 | 0) | |
| | 1 | 1 | 0 | X | X | X | X | X | S | S | S | S | I | I | I | I | GOTO(PRIMARY) |
| | X = DON'T CARE, S = SEQUENCER ADDRESS, I = INTERNAL RAM ADDRESS | | | | | | | | | | | | | | | | |
| BIT | (15 | 14 | 13 | 12 | 11 | 10 | 9 | 8 | 7 | 6 | 5 | 4 | 3 | 2 | 1 | 0) | |
| | 1 | 1 | 1 | X | X | X | X | X | X | X | X | X | P | P | P | P | RETURN(JUMP) |
| | X = DON'T CARE, P = POSITION | | | | | | | | | | | | | | | | |
| BIT | (15 | 14 | 13 | 12 | 11 | 10 | 9 | 8 | 7 | 6 | 5 | 4 | 3 | 2 | 1 | 0) | |
| 0) | 1 | 0 | 1 | 0 | 0 | 0 | 1 | 1 | 0 | 1 | 0 | 0 | 1 | 0 | 0 | 0 | BRANCH(BR) |
| 1) | 1 | 0 | 1 | 0 | 1 | 0 | 0 | 1 | 0 | 0 | 0 | 0 | 0 | 1 | 1 | 0 | BRANCH(RG+SYNC) |
| 2) | 1 | 0 | 1 | 0 | 1 | 0 | 1 | 0 | 0 | 0 | 0 | 0 | 1 | 1 | 0 | 0 | BRANCH(WG+SYNC) |
| 3) | 1 | 0 | 1 | 0 | 0 | 0 | 1 | 0 | 0 | 0 | 0 | 0 | 1 | 0 | 0 | 0 | BRANCH(WG) |
| 4) | 0 | 0 | 1 | C | C | C | C | C | 0 | 0 | 0 | 0 | 0 | 0 | 0 | 0 | WAIT(SERVO) |
| 5) | 1 | 1 | 1 | 0 | 0 | 0 | 0 | 0 | 0 | 0 | 0 | 0 | 0 | 0 | 0 | 0 | RETURN(JUMP) |
| 6) | 0 | 1 | 0 | C | C | C | C | C | 0 | 1 | 0 | 1 | 1 | 1 | 1 | 0 | WAIT(SERVO, RG, RE-SYNC) |
| 7) | 1 | 1 | 1 | 0 | 0 | 0 | 0 | 0 | 0 | 0 | 0 | 0 | 0 | 0 | 0 | 0 | RETURN(RETURN) |
| 8) | 0 | 0 | 0 | 0 | 0 | 0 | 0 | 0 | 1 | 0 | 0 | 0 | 1 | 0 | 0 | 0 | WAIT(STOP/RG OR SERVO) |
| 9) | 1 | 1 | 0 | 0 | 0 | 0 | 0 | 0 | 1 | 1 | 1 | 0 | 0 | 1 | 1 | 1 | GOTO(PRIMARY) |
| 10) | 0 | 0 | 1 | C | C | C | C | C | 0 | 0 | 0 | 0 | 0 | 0 | 0 | 0 | WAIT(SERVO) |
| 11) | 1 | 1 | 1 | 0 | 0 | 0 | 0 | 0 | 0 | 0 | 0 | 0 | 0 | 0 | 0 | 0 | RETURN(JUMP) |
| 12) | 0 | 0 | 1 | C | C | C | C | C | 0 | 0 | 0 | 0 | 0 | 0 | 0 | 0 | WAIT(SERVO) |
| 13) | 0 | 1 | 1 | C | C | C | C | C | 1 | 1 | 1 | 1 | 1 | 1 | 1 | 1 | WRITE(SYNC) |
| 14) | 1 | 0 | 0 | 0 | 0 | 0 | 0 | 1 | 0 | 1 | 0 | 1 | 1 | 1 | 1 | 0 | WRITE(RE-SYNC) |
| 15) | 1 | 1 | 1 | 0 | 0 | 0 | 0 | 0 | 0 | 0 | 0 | 0 | 0 | 0 | 0 | 0 | RETURN(JUMP) |

Referring now to FIGS. 11a, 11b, 12 and 13, which are flow-charts illustrating the sequences of the Secondary Sequencer Map. These flow-charts describes all of possible combinations found while reading or writing data. In either case, the branch instructions determine these possible states. Each state is described below:

"Branch" state:

This state indicates that the primary map is in a "decision" state. At this point, the secondary map needs to wait for the primary map to make its decision. Three possible conditions are:

1) The primary map has stopped because of write gate.
2) Read gate asserted
3) Reached served "Read Gate+Sync" state:

This state indicates that actual synced data is being processed. A "Re-sync" state must follow this state.

"Write Gate+Sync" state:

This state indicates that synced write data is being processed. A "PLD Sync Field" and a "Data Sync Marker Byte" must follow this state. "Write Gate" state:

This state indicates that no-synced write data is being written. This data is typically PLD sync field data, data sync marker or inter-record gap. In this case, the secondary map signals to the primary map to "gate" the beginning of its current sequence.

"Fall Through" state:

This state indicates that the primary map is not performing any significant task.

While one embodiment of this invention has been described, this description is not intended to be limiting and other embodiments within the scope of the present invention are possible. Thus, while this invention has been described using a Split Data Sector on a magnetic media storage system of a PC AT/IDE type computer in a DOS environment, the principles of this invention apply equally to the use of the Split Data Sector on non-magnetic media storage systems including but not limited to optical storage systems, and also to other non-PC AT/IDE computer systems and to other operating systems.

We claim:

1. A method for locating and operating data sectors on a disk comprising:
   sending a signal indicating detection to a pre-servo timer when a servo field is detected;
   estimating the time period between consecutive servo fields;
   when a servo field is expected, sending an estimating signal from the pre-servo timer to a disk controller;
   if the data sector is a contiguous data sector and the servo field occurs outside the data sector,
      suspending data operation until the end of the servo field,
      at the end of the servo field, reinstating data operation in a next data sector;
   if the data sector is a split data sector and the servo field occurs within the split data sector having a first portion and a second portion,
      suspending data operation until the end of the servo field,
      at the end of the servo field, sending a further signal indicating detection to the disk controller,
      reinstating the data operation in the second portion in response to the further signal indicating detection.

2. The method of claim 1 further comprising the step of buffering the first portion until the end of the servo section.

3. The method of claim 1 further comprising the step of combining the first portion and the second portion.

4. A method of reading or writing a split data sector on a recording track of a data storage system having a servo timer, the recording track having a plurality of servo fields, the method comprising the steps of:
- detecting one of the servo fields and sending a signal indicating detection of the servo field to the servo timer;
- reading or writing a first portion of the data sector on the recording track;
- receiving the signal indicating detection in the servo timer;
- after the signal indicating detection is received, estimating the time period to the next consecutive servo field;
- sending an estimating signal which indicates when the next consecutive servo field is expected;
- receiving the estimating signal and suspending the reading or writing of the data sector in response to the estimating signal;
- detecting the next consecutive servo field;
- after the next consecutive servo field is detected, resuming the reading or writing of the data sector such that a second portion of the data sector is read or written to.

5. The method of claim 4 further comprising the step of buffering the first portion of the data sector after the reading or writing of the first portion has been suspended.

6. The method of claim 4 further comprising the step of combining the first and second portions of the data sector.

7. A method of reading or writing a split data sector on a recording track of a data storage system having a servo timer, the recording track having a plurality of servo fields, the method comprising the steps of:
- dividing the data sector on the recording track into a plurality of groups of bytes;
- detecting one of said servo fields and sending a first signal to the servo timer indicating that a servo field has been detected;
- reading or writing a first portion of the plurality of groups of bytes in the data sector;
- receiving the first signal in the servo timer;
- after the first signal is received, estimating the time period to the next consecutive servo field;
- sending a second signal which indicates when the next consecutive servo field is expected;
- checking if the second signal has been received within the last group of bytes;
- if the second signal has been received within the last group of bytes, suspending the reading or writing of the data sector;
- detecting the next consecutive servo field;
- after the next consecutive servo field is detected, resuming the reading or writing of the plurality of groups of bytes in the data sector such that a second portion of the plurality of groups of bytes in the data sector are read or written to.

8. A device for operating data on a recording track of a data storage system, the recording track including a plurality of data sectors and servo fields, the device comprising:
- a servo detector which detects the servo fields and generates a first signal in response thereto;
- a servo timer which receives the first signal and after receiving the first signal estimates the time period to the next consecutive servo field, the servo timer sending a second signal which indicates when the next servo field is expected; and
- means for operating data on the recording track, the means for operating data receiving the second signal and operating data on the recording track in response to the second signal.

9. The device in claim 8 further comprising means for pausing operation of the data on the recording track after a servo field is detected.

10. The device in claim 9 further comprising means for reinstating operation of the data on the recording track after the servo field.

11. The device in claim 9 wherein the recording track comprises a split data sector, the split data sector comprising a first portion and a second portion; and one of the servo fields located between the first portion and the second portion.

12. The device in claim 10 wherein the recording track comprises a split data sector, the split data sector comprising a first portion and a second portion; and one of the servo fields located between the first portion and the second portion.

13. The device in claim 11 further comprising a means for combining the first portion and the second portion.

14. The device in claim 12 further comprising a means for combining the first portion and the second portion.

15. A device for reading or writing data on a recording track of a data storage system, the recording track including a plurality of data sectors and servo fields, at least one of the data sectors comprising a split data sector having a first portion and a second portion and a servo field therebetween, the device comprising:
- a servo detector which detects the servo fields and generates a first signal in response thereto;
- a servo timer which receives the first signal and after receiving the first signal estimates the time period to the next consecutive servo field, the servo timer sending a second signal which indicates when the next servo field is expected; and
- means for reading or writing data on the recording track;
- means for suspending the reading or writing operation after the first portion of the split data sector is read or written to if the second signal occurs in the at least one split data sector;
- means for resuming the reading or writing operation to read the second portion of the split data sector after the servo field.

16. The device of claim 15 further comprising means for combining the first and second portions of the split data sector.

17. The device of claim 15 wherein the data sectors are divided into a plurality of data groups and wherein the servo timer comprises:
- a pre-servo timer for estimating the time period to the next consecutive servo field; and
- a modulo timer which continuously synchronizes itself with the data stream from the means for reading or writing data, the modulo counter counting and resetting itself between each group of data; and
- wherein the means for suspending the reading or writing operation suspends the reading or writing operation if the second signal occurs within the last group of data.

18. A disk controller for reading or writing data on a recording track of a data storage system, the recording track including a plurality of data sectors and servo fields, at least one of the data sectors comprising a split data sector having a first portion and a second portion and a servo field therebetween, the disk controller comprising:

- a servo detector which detects the servo fields and generates a first signal in response thereto;
- a servo timer internal to the disk controller which receives the first signal and after receiving the first signal estimates the time period to the next consecutive servo field, the servo timer sending a second signal which indicates when the next servo field is expected; and
- means for reading or writing data on the recording track;
- means for suspending the reading or writing operation after the first portion of the split data sector is read or written to if the second signal occurs in the at least one split data sector;
- means for resuming the reading or writing operation to read the second portion of the split data sector after the servo field; and
- means for combining the first and second portions of the split data sector.

19. The device of claim 18 wherein the data sectors are divided into a plurality of data groups and wherein the servo timer comprises:

- a pre-servo timer for estimating the time period to the next consecutive servo field; and
- a modulo timer which continuously synchronizes itself with the data stream from the means for reading or writing data, the modulo counter counting and resetting itself between each group of data; and
- wherein the means for suspending the reading or writing operation suspends the reading or writing operation if the second signal occurs within the last group of data.

* * * * *